US011269938B2

(12) United States Patent
Vora et al.

(10) Patent No.: US 11,269,938 B2
(45) Date of Patent: Mar. 8, 2022

(54) DATABASE SYSTEMS AND METHODS FOR CONVERSATIONAL DATABASE INTERACTION

(71) Applicant: salesforce.com, inc., San Francisco, CA (US)

(72) Inventors: Darshil Vipul Vora, San Francisco, CA (US); Yongjun Kwak, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 340 days.

(21) Appl. No.: 15/629,143

(22) Filed: Jun. 21, 2017

(65) Prior Publication Data

US 2018/0373786 A1    Dec. 27, 2018

(51) Int. Cl.
| | |
|---|---|
| *G06F 16/00* | (2019.01) |
| *G06F 16/33* | (2019.01) |
| *H04L 51/02* | (2022.01) |
| *G06F 16/16* | (2019.01) |
| *G06F 16/242* | (2019.01) |

(52) U.S. Cl.
CPC ........ *G06F 16/3338* (2019.01); *G06F 16/168* (2019.01); *G06F 16/243* (2019.01); *H04L 51/02* (2013.01)

(58) Field of Classification Search
CPC .. G06F 16/3338; G06F 16/243; G06F 16/168; G06F 17/30864; G06F 17/30867; G06F 17/30672; G06F 17/3064; H04L 51/02; G06Q 30/02
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |

(Continued)

*Primary Examiner* — Ashish Thomas
*Assistant Examiner* — Suman Rajaputra
(74) *Attorney, Agent, or Firm* — LKGlobal | Lorenz & Kopf, LLP

(57) ABSTRACT

Computing systems, database systems, and related conversational interaction methods are provided for customizing database components. One exemplary method involves receiving a conversational user input, analyzing the conversational user input to identify a requested action with respect to a database component, identifying a plurality of attributes associated with the requested action with respect to the database component, determining a missing subset of the plurality of attributes based at least in part on the user input, prompting a user for values of the missing subset of attributes, receiving a second conversational user input responsive to the prompt, and performing the requested action with respect to the database component in a database using the second user input.

19 Claims, 8 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,165,886 B1* | 4/2012 | Gagnon .................. G10L 15/19 704/275 |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,966,440 B2 | 2/2015 | No et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0016678 A1* | 1/2012 | Gruber .................. G06F 9/54 704/275 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0055118 A1 | 2/2013 | Donovan et al. |
| 2013/0055201 A1* | 2/2013 | No .................. G06F 3/048 717/113 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0115456 A1* | 4/2014 | White .................. G10L 15/22 715/708 |

* cited by examiner and methods for customizing components in a database system.

DATABASE SYSTEMS AND METHODS FOR CONVERSATIONAL DATABASE INTERACTION

TECHNICAL FIELD

Embodiments of the subject matter described herein relate generally to database systems, and more particularly, to methods and systems for customizing components in a database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

In practice, the different tenants often have different types of data and/or different relationships between data that they would like to maintain in the multi-tenant system, along with different types of operations they would like to be able to perform on their data to achieve different business objectives. Accordingly, some multi-tenant systems include an application platform that supports a customizable user experience, for example, to create custom applications, web pages, reports, tables, functions, and/or other objects or features. However, creating customizations can be difficult and time-consuming for users who are relatively inexperienced with computer programming or are otherwise unfamiliar with the platform(s) of the multi-tenant system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
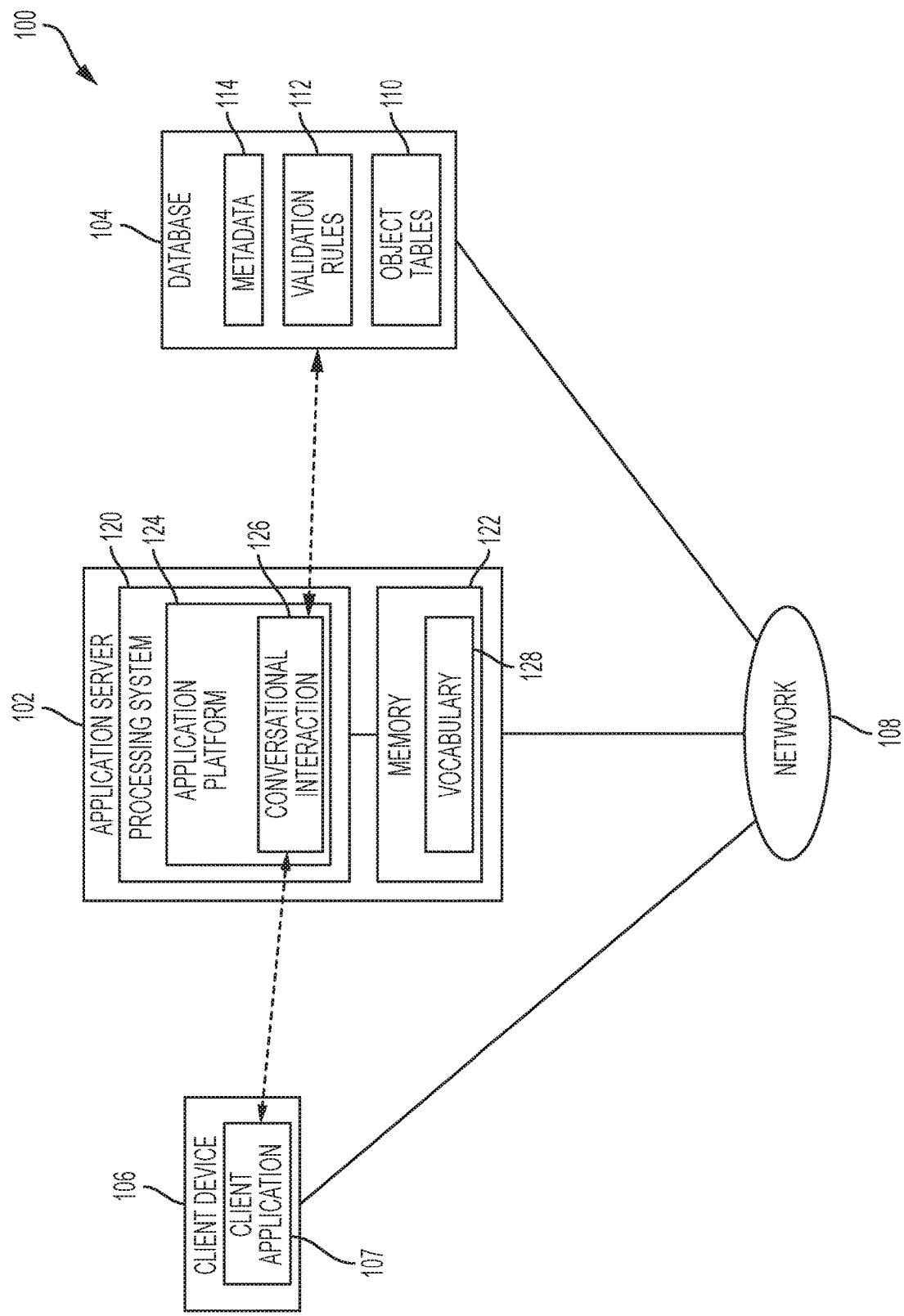
FIG. 1 is a block diagram of an exemplary computing system.

Embodiments of the subject matter described herein generally relate to methods and systems for creating, instantiating, or otherwise customizing components in a database system in a conversational manner. In this regard, in some embodiments, the conversational user input may be realized as an unconstrained string or combination of words provided in a free-form or unstructured manner using natural language rather than a predefined syntax. The conversational user input is parsed or otherwise analyzed to identify the relevant component of the database system to which the user input is directed along with the corresponding action that is desired to be performed with respect to that component. After identifying the particular database action to be performed with respect to a particular type of database component, attributes, fields, or prerequisites associated with that particular type of database component and/or that particular type of database action may be identified. The received user input can then be further analyzed in the context of that particular component and requested database action. In this regard, values for those attributes, fields, or prerequisites may be identified within the received user input, while attributes, fields, or prerequisites that are missing from within the received user input may also be identified. Thereafter, the system may prompt the user to provide values for those missing attributes, fields, or prerequisites and receive subsequent user input corresponding to those attributes, fields, or prerequisites. Once sufficient attributes or fields associated with performing the requested database action with that particular component have been provided or otherwise identified, the system automatically performs the requested database action with respect to the database component in a database. While the subject matter may be described herein in the context of an on-demand database system, the subject matter is not necessarily limited to on-demand application or database systems, multi-tenant systems, or any other particular system architecture or arrangement described herein.

In exemplary embodiments, a server of the database system receives a conversational user input corresponding to a particular action with respect to a database component over a network from a client device coupled to the network. The server (or an application or process executing thereon) identifies the requested action and type of database component, and then accesses the database to retrieve rules or other metadata that define the attributes, fields, or other prerequisites for performing the requested action on that type of database component. The server may then reanalyze the user input to ascertain which attributes, fields, or other prerequisites have been provided and which are missing, and then prompt the user for missing attributes, fields, or other prerequisites. Additional conversational user input(s) may be received, and any number of iterations of the server prompting the user and receiving responsive user input may be performed. Once sufficient attributes, fields, or other prerequisites have been provided, the server performs the requested database action with respect to the database component in a database.

For example, in one embodiment, the server of the database system may receive a conversational user input identifying a desire to create or instantiate a custom object in the database, such as, for example, a custom application. The server accesses the database to identify the attributes, fields, or other prerequisites for creating a custom application, then reanalyzes the initially received user input to determine which of those attributes, fields, and/or prerequisites have been provided and which are missing. For the missing attributes, fields, or prerequisites, the server may sequentially prompt the user to provide corresponding values and receive subsequent conversational user inputs. Once the attributes, fields, or other prerequisites for creating a custom application have been provided to the server, the server interacts with the database to create or otherwise instantiate the custom application in the database using the provided attributes, fields, and/or prerequisites. Thus, a user can customize the database experience conversationally, without requiring detailed knowledge of the programming language(s) utilized by the database system, the database schema, or other technical aspects of implementing the customization, and without having to navigate graphical user interface (GUI) menus or perform other manually intensive tasks.

FIG. 1 depicts an exemplary embodiment of a computing system 100 capable of supporting conversational interactions with a user of a client device 106 and performing corresponding actions with respect to one or more database components maintained in a database 104 and utilized by a server 102 to support an instance of an application provided by the server 102. In the illustrated embodiment, the server 102 is communicatively coupled to the database 104 and the client device 106 via a communications network 108. The communications network 108 may be realized as any sort or combination of wired and/or wireless computer network, a cellular network, a mobile broadband network, a radio network, the Internet, or the like. It should be noted that FIG. 1 is a simplified representation of a computing system 100 for purposes of explanation and is not intended to be limiting. For example, in practice, multiple instances of client devices 106 communicating on the network 108 may be present, with any number of instances of applications being provided by the server 102 to various instances of client devices 106.

The server 102 generally represents a computing device, computing system or another combination of processing logic, circuitry, hardware, and/or other components configured to support the conversational interaction processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof. In one or more embodiments, the programming instructions cause the processing system 120 to create, generate, or otherwise facilitate the application platform 124 that generates or otherwise provides instances of a virtual application at run-time (or "on-demand") based at least in part upon code and other data that is stored or otherwise maintained by the database 104. Accordingly, for purposes of explanation but without limitation, the server 102 may alternatively be referred to herein as an application server 102.

In exemplary embodiments, the programming instructions also cause the processing system 120 to create, generate, or otherwise facilitate a conversational interaction engine 126 that supports the conversational interaction processes and related tasks, operations, and/or functions described herein. Depending on the embodiment, the conversational interaction engine 126 can be integrated with or otherwise incorporated as part of a virtual application, or be realized as a separate or standalone process, application programming interface (API), or the like that is capable of interacting with the client device 106 independent of the virtual application to perform actions in the database 104. As described in greater detail below, the conversational interaction engine 126 incorporates or otherwise references a vocabulary 128 of words, phrases, phonemes, or the like associated with a particular language that supports conversational interaction with the user of the client device 106. For example, the vocabulary 128 may be utilized by the conversational interaction engine 126 to provide speech recognition or otherwise parse and resolve text or other conversational input received by the conversational interaction engine 126, as well as generate or otherwise provide conversational output (e.g., text, audio, or the like) to the client device 106 for presentation to the user (e.g., in response to received conversational input). In the illustrated embodiment, the vocabulary data 128 is stored or otherwise maintained in memory 122, however, in alternative embodiments, the vocabulary data 128 may be stored or maintained in the database 104.

The client device 106 generally represents an electronic device coupled to the network 108 that may be utilized by a user to access the application platform 124 on the application server 102 to retrieve data from the database 104 via the network 108. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like, to access or otherwise initiate an instance of a virtual application presented on the client device 106.

In exemplary embodiments, the database 104 stores or otherwise maintains data for integration with or invocation by a virtual application in objects organized in object tables 110. In this regard, the database 104 includes a plurality of different object tables 110 configured to store or otherwise maintain alphanumeric values, metadata, or other descriptive information that define a particular instance of a respective type of object associated with a respective object table 110. For example, the virtual application may support a number of different types of objects that may be incorporated into or otherwise depicted or manipulated by the virtual application, with each different type of object having a corresponding object table 110 that includes columns or fields corresponding to the different parameters or criteria that define a particular instance of that object.

In exemplary embodiments described herein, the database 104 stores or otherwise maintains application objects (e.g., an application object type) where the application object table 110 includes columns or fields corresponding to the different parameters or criteria that define a particular application capable of being generated or otherwise provided by the application platform 124 on a client device 106. In this regard, the database 104 may also store or maintain graphical user interface (GUI) objects that may be associated with or referenced by a particular application object and include columns or fields that define the layout, sequencing, and other characteristics of GUI displays to be presented by the application platform 124 on a client device 106 in conjunction with that application. Additionally, the database 104 stores or otherwise maintains additional database objects for association and/or integration with the application, which may include custom objects and/or standard objects, as described in greater detail below.

In exemplary embodiments, the database 104 also includes or otherwise maintains one or more validation tables 112 that include one or more validation rules or criteria associated with respective types of database object types that may be applied to entries in the various database object tables 110. A validation rule provides validation criteria for one or more fields (or columns) of a particular database object type, such as, minimum and/or maximum values for a particular field, a range of allowable values for the particular field, a set of allowable values for a particular field, or the like. Additionally, the validation rule may provide a default value to be assigned to a field (or column) of a particular database object table 110 when the value for that field of a particular record or entry in that database object table 110 does not satisfy the validation criteria for that field. In some embodiments, the validation rules associated with a particular database object type may identify or otherwise indicate required fields for that particular object.

Additionally, the database 104 stores or otherwise maintains metadata 114, which may be utilized to perform data manipulation and/or formatting. For example, the metadata 114 may include or define describe any number of workflows, process flows, formulas, business logic, structure and other database components or constructs that may be associated with a particular application database object. In this regard, in some embodiments, the metadata 114 may associated with a particular type of application or other database component may identify or otherwise indicate other database objects may be required for supporting the particular workflows, process flows, formulas, business logic, or other aspects of the logical structure of that application.

As described in greater detail below in the context of FIG. 2, the application platform 124 and/or the conversational interaction engine 126 receives or otherwise obtains a conversational input from a user of the client device 106 (e.g., via client application 107 and network 108) and parses the conversational input using the conversational vocabulary 128 to identify or otherwise discern a particular type of action that the user would like to perform with respect to a particular type of database object in the database. Based on the requested action and database object, the conversational interaction engine 126 accesses the database 104 to identify or otherwise determine what additional information or data may be required for performing the requested database action. For example, if the recognized database action is creating a particular type of object, the conversational interaction engine 126 accesses the metadata 114 and/or validation rules 112 associated with that particular type of object to identify any required fields for creating that particular type of object and/or other types of database objects required for supporting that particular type of object.

Based on the identified required attributes associated with the requested action and database object, the conversational interaction engine 126 may reanalyze the conversational input using the conversational vocabulary 128 to identify or otherwise discern which of the required attributes are provided within the conversational input. The conversational interaction engine 126 identifies a subset of the required attributes that are missing or otherwise have not been provided or for which invalid values were provided, and utilizes the conversational vocabulary 128 to generate or otherwise provide a conversational prompt requesting input of one or more of the missing subset of required attributes. The application platform 124 and/or the conversational interaction engine 126 generates or otherwise provides the conversational prompt on the client device 106 (e.g., within the client application 107). In response to the prompt, the user may respond with a subsequent conversational input. The conversational interaction engine 126 receives or otherwise obtains the subsequent conversational input and analyzes the input to identify the provided values for the prompted attribute(s) of the missing subset.

The sequence of the conversational interaction engine 126 receiving conversational input and providing conversational prompts influenced by the preceding conversational input may be repeated until values have been provided for each attribute of the missing subset of attributes. After identifying that values for the required attributes associated with the requested action and database object have been provided, the conversational interaction engine 126 initiates or otherwise performs the requested database action with respect to one or more database object(s) in the database 104. For example, if the requested database action is creating an application, the application platform 124 and/or conversational interaction engine 126 creates or otherwise instantiates a new entry for the application in the application object table 110 using valid input values for the required fields of the application object table 110, along with creating or otherwise instantiating any required GUI objects or other database objects or components to be associated with the entry for that application object at the appropriate locations in the database 104 and establishing associations between the entry for that application object and the other entries, objects or components in the database 104.

Figure 2:
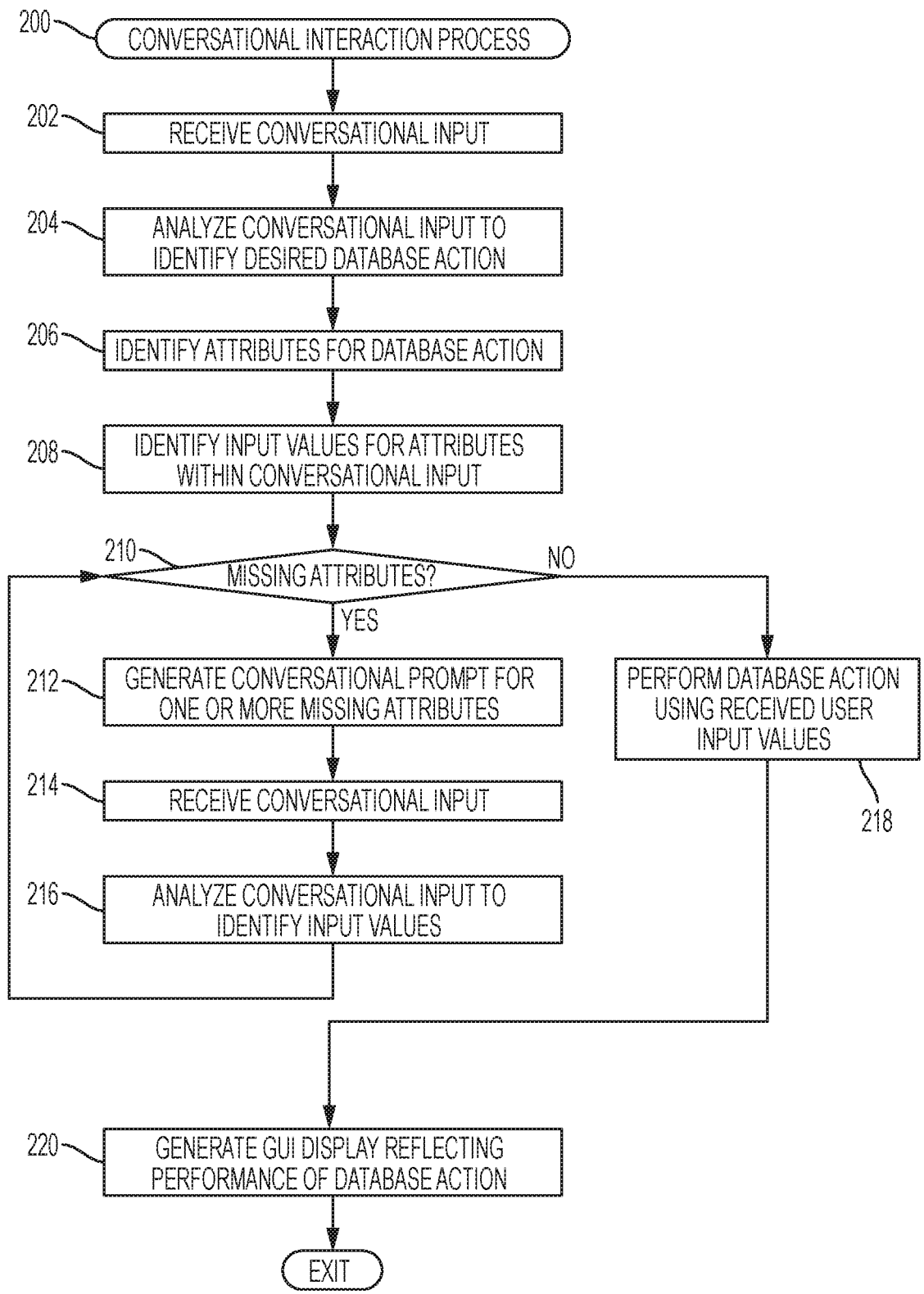
FIG. 2 is a flow diagram of an exemplary conversational interaction process suitable for implementation in the computing system of FIG. 1 in accordance with one or more embodiments.

FIG. 2 depicts an exemplary embodiment of a conversational interaction process 200 suitable for implementation in a computing system to enable performance of database actions using conversational user inputs. For illustrative purposes, the following description may refer to elements mentioned above in connection with FIG. 1. In this regard, while portions of the conversational interaction process 200 may be performed by different elements of the computing system 100, for purposes of explanation, the subject matter is described herein in the context of the conversational interaction process 200 being primarily performed by the application platform 124 and/or conversational interaction engine 126 that are implemented or executed by the processing system 120 at the server 102. It should be appreciated that the conversational interaction process 200 may include any number of additional or alternative tasks, the tasks need not be performed in the illustrated order and/or the tasks may be performed concurrently, and/or the conversational interaction process 200 may be incorporated into a more comprehensive procedure or process having additional functionality not described in detail herein. Moreover, one or more of the tasks shown and described in the context of FIG. 2 could be omitted from a practical embodiment of the conversational interaction process 200 as long as the intended overall functionality remains intact.

The conversational interaction process 200 begins by receiving or otherwise obtaining a conversational input from a user of a client device (task 202). The conversational user input is indicative of the particular database action the user would like to perform. Depending on the embodiment, the conversational input may be received unprompted, or alternatively, the user may manipulate the client device 106 to select or otherwise activate a GUI element that enables or initiates the conversational interaction process 200. For example, in one or more embodiments, the conversational interaction process 200 may be initiated in response to a user selecting a GUI element for a help feature, a digital assistant, or similar feature supported by the application platform 124. In response, the application platform 124 may generate or otherwise provide a GUI display or other GUI elements within the client application 107 on the client device 106 that prompt the user to indicate what he or she would like to accomplish. Thereafter, the user may input (e.g., via typing, swiping, touch, voice, or any other suitable method) a conversational string of words in a free-form or unconstrained manner, which is captured by the user input device of the client device 106 and provided over the network 108 to the application platform 124 and/or the conversational interaction engine 126 via the client application 107 (or a virtual application provided therein). That said, in other embodiments, the user may upload an image or other file that may be parsed, analyzed, or otherwise converted into a conversational input.

In the illustrated embodiment, the conversational interaction process 200 continues by parsing or otherwise analyzing the conversational input to identify the desired database action the user would like to perform along with the type of database component implicated by that database action (task 204). For example, using the vocabulary data 128, the conversational interaction engine 126 may analyze the conversational user input to identify any words (or variants) that match or otherwise correspond to database actions and/or components supported by the application platform 124. That said, in alternative embodiments, in lieu of identifying the desired database action via conversational input, the application platform 124 could generate or otherwise provide a sequence of GUI displays and/or elements that sequentially step through potential database actions until the desired database action with respect to the desired type of database component is identified by the user.

Once the desired database action and relevant database component are identified, the conversational interaction process 200 continues by identifying or otherwise determining attributes associated with performing the desired database action on or with respect to that type of database component (task 206). In this regard, the application platform 124 and/or the conversational interaction engine 126 accesses the metadata 114 and validation rules 112 to identify any criteria or requirements for performing the desired database action with respect to that type of database component, along with other potential fields or attributes associated with the database component. For example, if the user is attempting to create a custom application, the application platform 124 and/or the conversational interaction engine 126 may identify that the application object table 110 includes a name field, a layout or template field, a custom object field, and/or the like.

After identifying the attributes associated with performing the desired database action, the illustrated conversational interaction process 200 reanalyzes the conversational user input to identify whether it contains any input values for any of the attributes (task 208). For example, using the vocabulary data 128 and the knowledge of the relevant attributes, the conversational interaction engine 126 may reanalyze the conversational user input string to determine, based on the sentence structure or context, whether the user has input values for any of the attributes. Any recognized input values from the conversational user input string may be stored or otherwise maintained at the server 102 (e.g., in a buffer or in memory 122) for subsequently performing the database action, as described in greater detail below.

The conversational interaction process 200 continues by identifying or otherwise determining whether there are any missing prerequisite attributes for performing the database action (task 210). In this regard, based on the metadata 114 and/or validation rules 112 associated with the particular database action or the particular type of database component being invoked, the application platform 124 and/or the conversational interaction engine 126 identifies any required fields or attributes for performing the database action to thereby verify or otherwise confirm whether or not valid values for the prerequisite attributes for performing the database action have been provided. Thus, if the database action corresponds to creating an entry for a particular type of object in a respective object table 110, the application platform 124 and/or the conversational interaction engine 126 may determine which columns or fields of that entry are required for identifying or otherwise maintaining the object in the object table 110, and then verify whether input values for those fields have been received, and if so, apply the relevant subset of validation rules to those identified fields to verify that the received values are valid. For example, if the user is attempting to create a custom application, the application platform 124 and/or the conversational interaction engine 126 may identify that a name for the application is a required field for the application object table 110.

In response to identifying a missing subset of prerequisite attributes for performing the database action, the conversational interaction process 200 continues by generating or otherwise providing a prompt requesting the user input values for one or more of the missing subset (task 212). For example, the application platform 124 and/or the conversational interaction engine 126 may utilize the vocabulary data 128 along with the identification of a required field to generate a string of words that requests or otherwise prompts the user to input a value for the required field, and then generates or otherwise provides a corresponding output (e.g., a GUI display or other GUI elements, an audio output, or the like) via the client application 107 on the client device 106 that prompts the user to input a value for a particular field. In this regard, in some embodiments, the application platform 124 and/or the conversational interaction engine 126 may also utilize validation rules or other criteria associated with that field to provide a corresponding indication of the acceptable type or range of values for the field in conjunction with the prompt.

Thereafter, the illustrated conversational interaction process 200 continues by receiving or otherwise obtaining a subsequent conversational user input and parsing or otherwise analyzing the conversational input to identify input value for the prompted field (tasks 214, 216). The conversational interaction process 200 repeats the determination of whether there are any missing prerequisite attributes for performing the database action, and if so, repeats the process of prompting the user for input values for one or more of the missing subset of attributes, receiving additional conversational input, and identifying the input value for the prompted attribute(s) (tasks 212, 214, 216) until all prerequisite attributes for performing the database action have been identified or otherwise provided.

For example, if the user is attempting to create a custom application, the application platform 124 and/or the conversational interaction engine 126 may identify that a name for the application is one required field for the application object table 110 and an application template or layout supported by the application platform 124 is another required field for the application object table 110. The application platform 124 and/or the conversational interaction engine 126 may first generate or otherwise provide a prompt for the application name on the client device 106, receive a conversational input string from the client device 106, and analyze the conversational input string to identify the input value for the name of the custom application to be created. In this regard, if the input value is invalid or otherwise fails to satisfy validation criteria for the application name field, the application platform 124 and/or the conversational interaction engine 126 may repeatedly prompt the user and/or provide guidance (e.g., a graphical or auditory representation or explanation of the valid range of values or other applicable validation criteria for the application name) until a valid name value is provided.

Thereafter, the application platform 124 and/or the conversational interaction engine 126 may generate or otherwise provide another prompt for the type of template or layout that the user would like to use on the client device 106, receive another conversational input string from the client device 106, and analyze the conversational input string to identify the input value corresponding to the template or layout for custom application to be created. In this regard, if the input value is invalid or otherwise fails to satisfy validation criteria for the template field, the application platform 124 and/or the conversational interaction engine 126 may repeatedly prompt the user and/or provide guidance (e.g., a listing of the types or names of the templates or layouts supported by the application platform 124) until a valid template value is provided.

After the prerequisite attributes for performing the database action have been provided, the conversational interaction process 200 performs the database action with respect to the database component using the provided values for those attributes (task 218). For example, the application platform 124 and/or the conversational interaction engine 126 may automatically create an entry for a new custom application object in the application object table 110 having a name field equal to the user input provided responsive to a first prompt requesting the application's name and a template field equal to the user input provided responsive to a second prompt requesting the template the user would like to use for the custom application. Additionally, the application platform 124 and/or the conversational interaction engine 126 may automatically instantiate or otherwise create one or more additional objects in the database 104 for supporting the new custom application using one or more of the input values. For example, based on the identified template, such as, for example, one or more GUI objects may be generated using the name field or other fields of the new custom application object and stored in the GUI object table 110 in association with the entry for the new custom application object in the application object table 110.

In exemplary embodiments, the conversational interaction process 200 generates or otherwise provides indication of performance of the database action at the client device (task 220). For example, after creating a new custom application object and corresponding GUI objects in the database 104, the application platform 124 may generate or otherwise provide a graphical representation of the new custom application object within the client application 107 on the client device 106 using the GUI objects associated with the new custom application object in the database 104. In other words, the application platform 124 updates the GUI display within the client application 107 on the client device 106 to reflect instantiation of the new custom application within the computing system 100 having the indicated name and template attributes. Thereafter, the user of the client device 106 may proceed with manipulating, modifying, utilizing, or otherwise interacting with the custom application.

In some embodiments, the user may reinitiate the conversational interaction process 200 to further define attributes of the custom application or otherwise perform database actions with respect to database components that may be integrated with or incorporated into the custom application. For example, the conversational interaction process 200 could be reinitiated to create or otherwise define a new type of custom object that the user would like to integrate or utilize within the context of the custom application. In this regard, the user may conversationally define attributes of the new custom object type, with the application platform 124 and/or the conversational interaction engine 126 automatically updating the database 104 to support the new custom object type and establishing associations between the new custom object type and the custom application. The conversational interaction process 200 could similarly be performed to incorporate or associate existing objects (e.g., standard object types) or other existing components (e.g., workflows, processes, business logic, or the like) in the database 104 with the custom application.

As noted above, in some embodiments, in lieu of an initial conversational input string, the initial input (e.g., task 202) provided to the conversational interaction process 200 could be a file uploaded to the server 102 via the network 108. In one embodiment, the user could provide an image file that depicts a flow chart or some other illustration that can be analyzed by the conversational interaction engine 126 to identify textual information within the file. Based on the type of image uploaded, the conversational interaction engine 126 may identify the relevant database components to be created (e.g., task 204) and then analyzes existing input values for various attributes of those database components (e.g., task 206) from within the image. For example, to create a custom application, a user of the client device 106 may upload a flow chart depicting the logical flow associated with the desired application. The conversational interaction engine 126 may analyze the flow chart using the vocabulary data 128 to identify a name or title associated with the flow chart, and assign the name or title of the flow chart to the name field of the custom application to be created. Additionally, the conversational interaction engine 126 may match the logical structure of the flow chart to the metadata 114 for a particular application template, layout, workflow, or the like and associate or otherwise assign that template, layout, workflow, or the like to the relevant field(s) of the custom application object. Thereafter, using the vocabulary data 128 and the metadata 114 associated with the application object type, the conversational interaction engine 126 may reanalyze the flow chart using the vocabulary data 128 to identify input values provided for additional attributes of the application object (e.g., task 208) and identify any missing attributes for the new custom application corresponding to the uploaded flow chart (e.g., task 210). Thereafter, the conversational interaction process 200 continues by prompting the user of the client device 106 for those missing attributes to thereby supplement the uploaded file and perform the desired database action.

Figure 3:
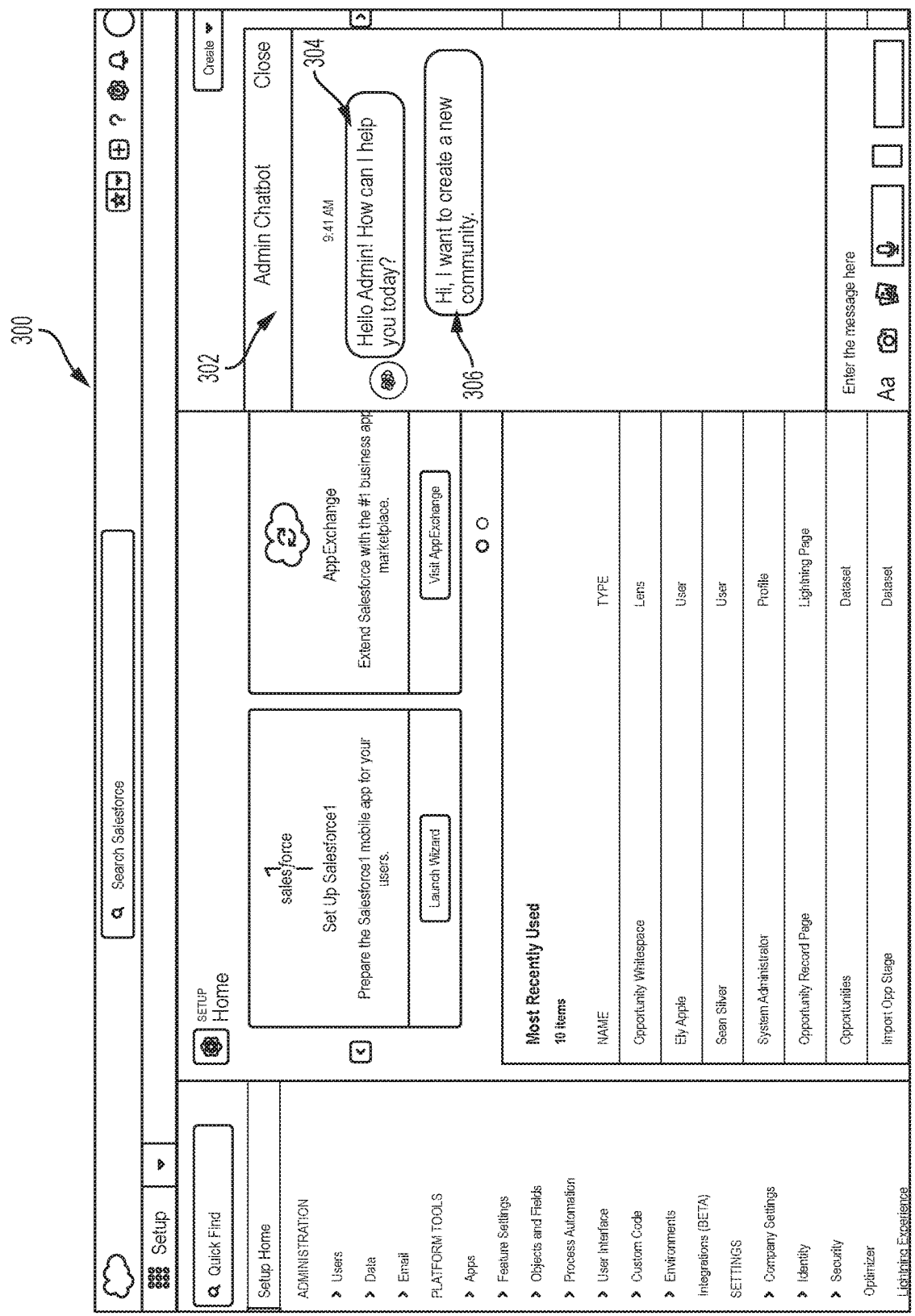
FIGS. 3-6 depict an exemplary graphical user interface (GUI) display sequence illustrating the conversational interaction process of FIG. 2 in accordance with one or more exemplary embodiments.
Figure 4:
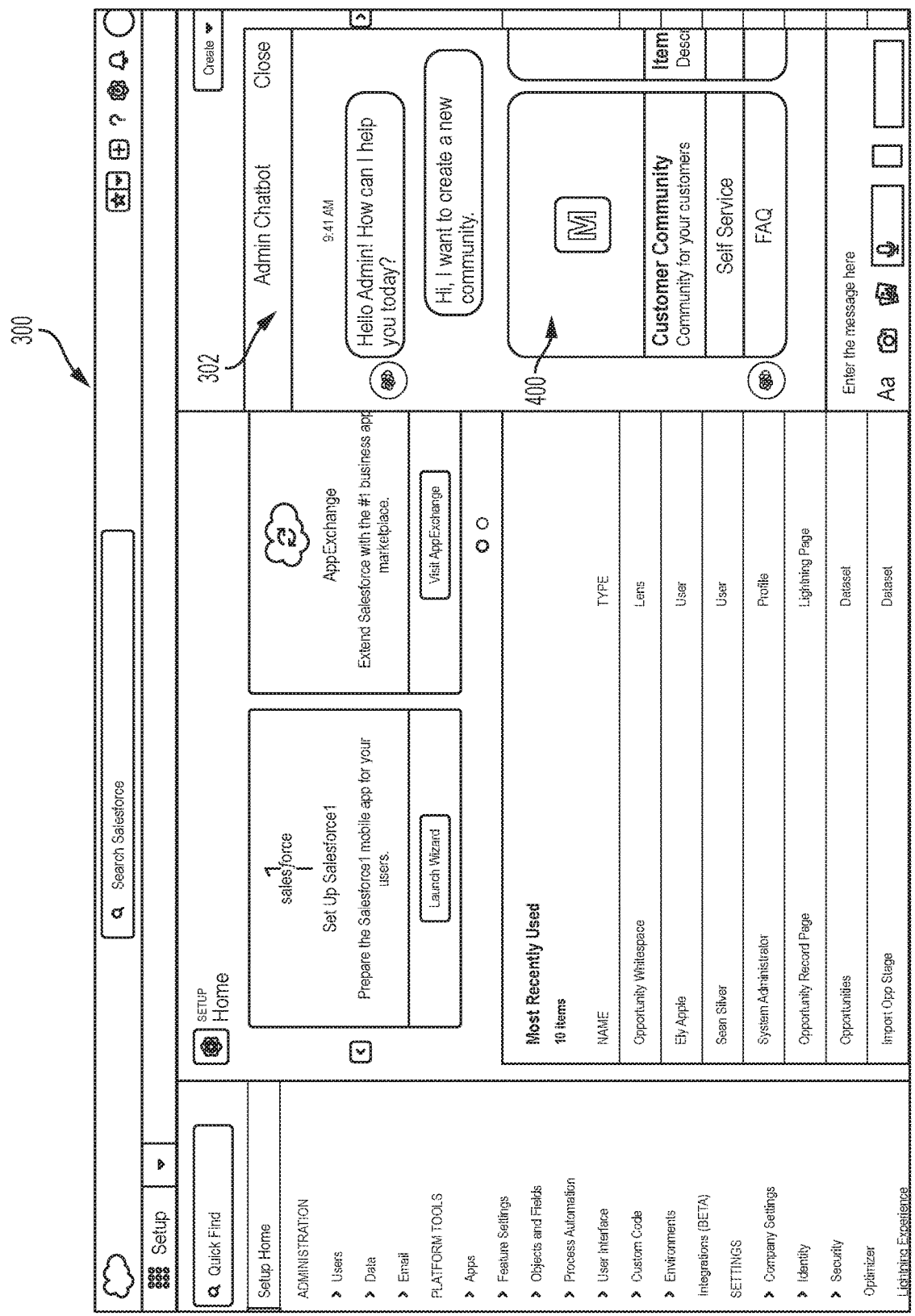

FIGS. 3-6 depict an exemplary GUI display sequence that may be presented on a client device 106 in the computing system 100 in connection with the conversational interaction process 200 of FIG. 2. Referring first to FIG. 3, the illustrated GUI display 300 that may be presented on the client device 106 includes an overlying GUI display or region 302 that supports conversational interaction with the user. The conversation region 302 may be initially populated by the application platform 124 and/or the conversational interaction engine 126 with a prompt 304 that solicits conversational input within the conversation region 302. In response to receiving an initial conversational input 306 from the user via the conversation region 302, the conversational interaction engine 126 analyzes the initial conversational user input 306 using the vocabulary data 128 to identify the desired database action as creating a new instance of a community object in the database 104. Thereafter, the conversational interaction engine 126 utilizes the community object metadata 114 to identify the type of community as a missing attribute yet to be provided and generates or otherwise provides a prompt within the conversation region 302 requesting that the user input, select, or otherwise identify the type of community to be created. For example, as illustrated in FIG. 4, the conversational interaction engine 126 may present a menu or list 400 of the different types of communities (or community templates) that may be selected by a user. The illustrated list 400 includes icons or other GUI elements corresponding to different types of communities, which may be selectable in lieu of additional conversational input in some embodiments.

Figure 5:
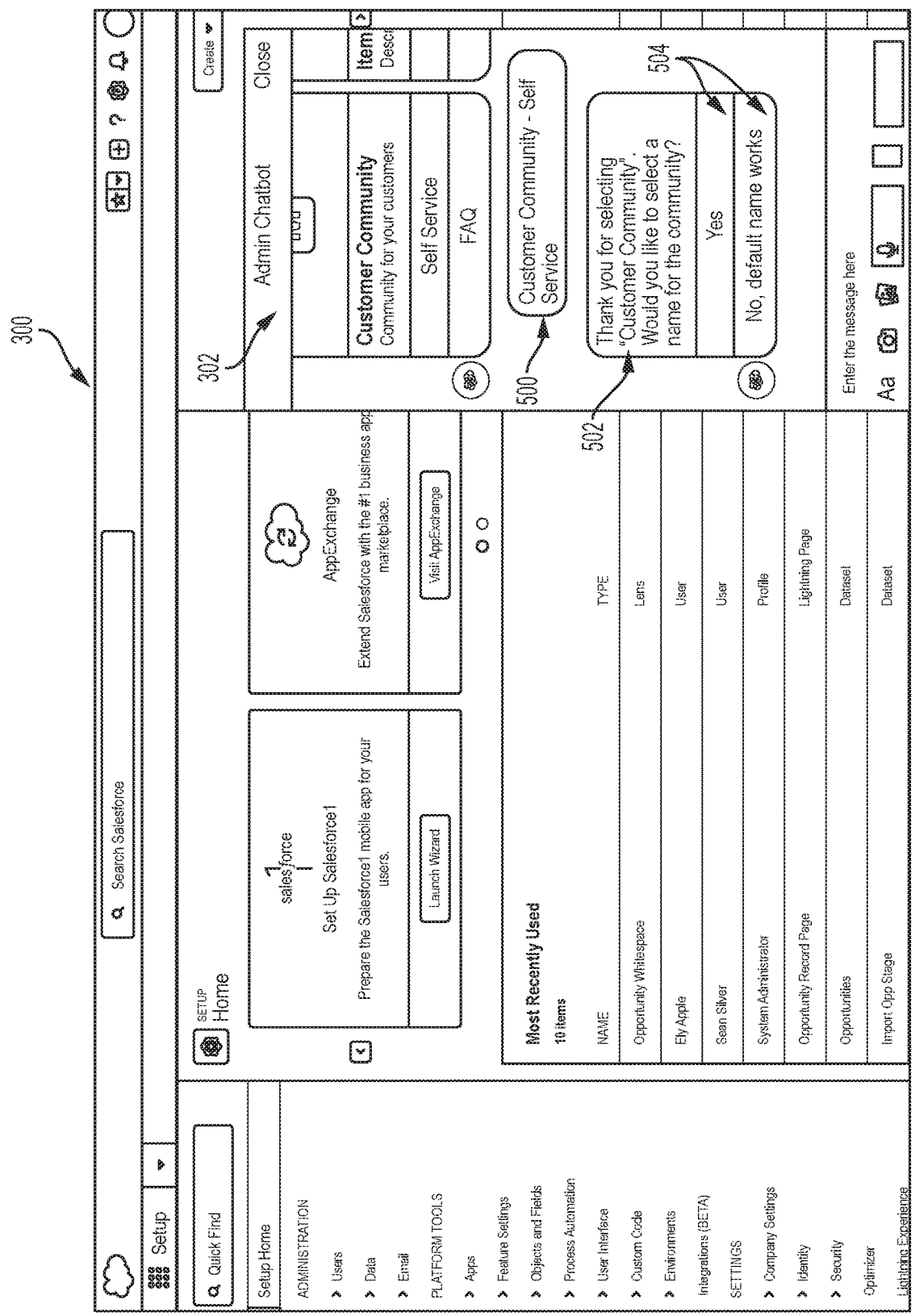

Referring now to FIG. 5, in response to receiving another conversational input 500, the conversational interaction engine 126 analyzes the user input 500 using the vocabulary data 128 and in the context of the previously provided prompt 400 to identify a self-service customer community as the desired type or template for the new community to be created. Thereafter, the conversational interaction engine 126 utilizes the community object metadata 114 to identify a missing value for the name field for the new community instance and generates or otherwise provides a corresponding prompt 502 that requests the user identify, select, or otherwise provide name information. In the illustrated embodiment, the prompt 502 includes or is otherwise accompanied by a list of potential or suggested responses 504 to the prompt 502. Similar to the elements in the list 400, the responses 504 may be realized using selectable GUI elements that may be selected by the user to respond to the prompt 502 in lieu of conversational input.

Figure 6:
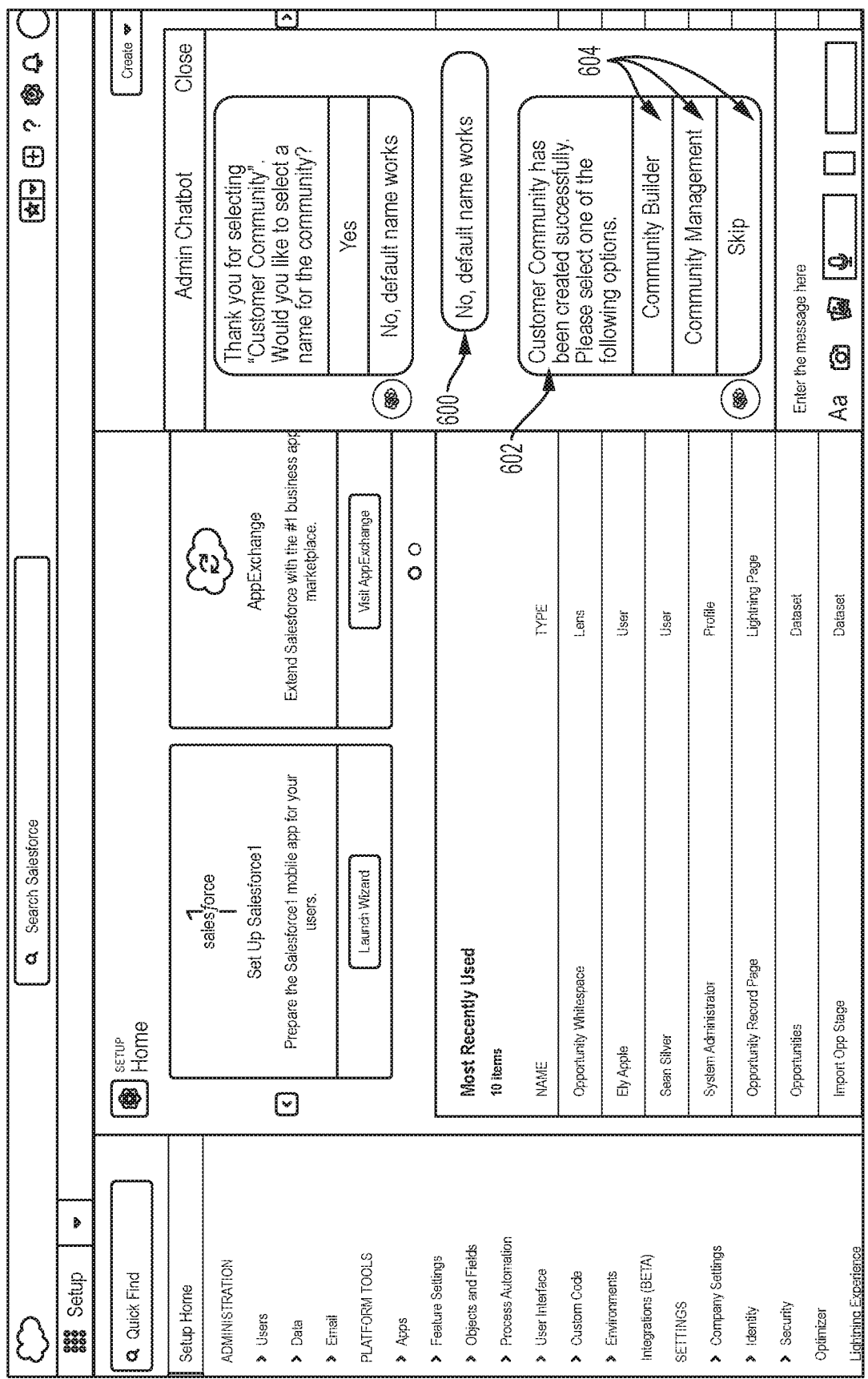

Referring now to FIG. 6, in response to receiving another conversational input 600, the conversational interaction engine 126 analyzes the user input 600 using the vocabulary data 128 and in the context of the previously provided prompt 502 to identify selection of a default name for the new community. Thereafter, the conversational interaction engine 126 recognizes valid values for the prerequisite attributes for creating the new community have been provided and creates or otherwise instantiates a new instance in the community object table 110 having the attributes input via the conversational interaction process 200 (e.g., a new self-service customer community with the default name). In some embodiments, the application platform 124 and/or the conversational interaction engine 126 may automatically generate or otherwise provide a landing page GUI display corresponding to the new community in lieu of the current GUI display 300, for example, by redirecting the client application 107 to a web page corresponding to the new self-service customer community with the default name.

In the illustrated embodiment, the conversational interaction engine 126 generates or otherwise provides an indication 602 that the requested database action(s) have been completed. Additionally, in the illustrated embodiment, the conversational interaction engine 126 may also generate or otherwise provide indicia 604 of additional recommended or suggested actions based on performance of the requested database action. For example, upon creating of a new instance of an object, the conversational interaction engine 126 may consult a wizard or similar feature to identify additional GUIs or steps that the user may wish to pursue and provide graphical representation of those identified GUIs or steps. Thus, a user can conveniently create a new instance of an object in a database conversationally and navigate to an appropriate GUI display or feature to perform additional actions or modifications with respect to the created instance without having to manually navigate within the settings or configuration menus of the virtual application or do any coding or programming to effectuate the initial creation of an object.

Figure 7:
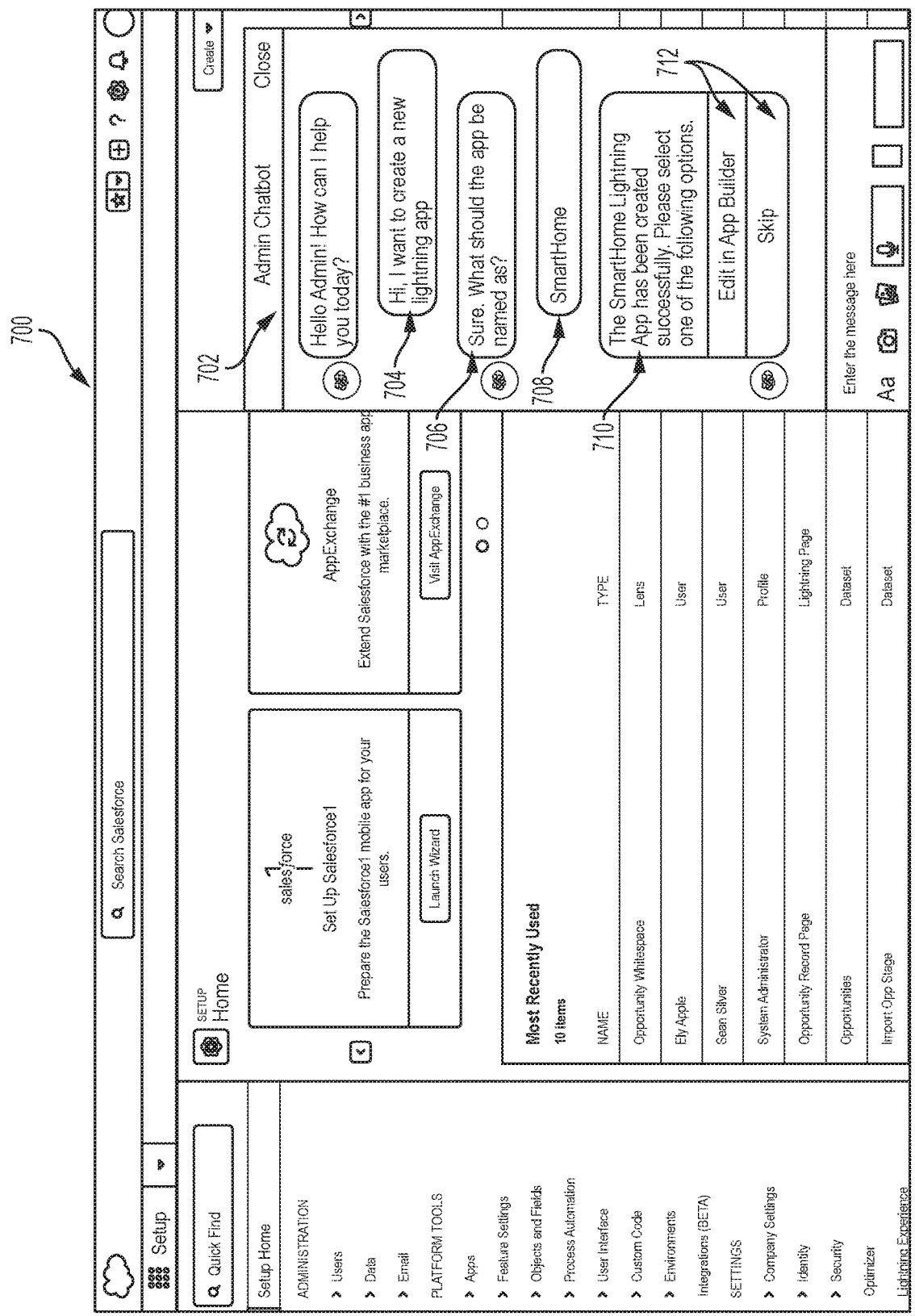
FIG. 7 depicts an exemplary graphical user interface (GUI) display illustrating the conversational interaction process of FIG. 2 in accordance with one or more exemplary embodiments.

FIG. 7 depicts another exemplary embodiment of a GUI display 700 reflecting the conversational interaction process 200 of FIG. 2. The GUI display 700 includes a conversation region 702 initially populated with a prompt that solicits conversational input within the conversation region 702 in a similar manner as described above. In response to receiving an initial conversational input 704, the conversational interaction engine 126 recognizes creating a new application in the database 104 as the desired database action. Based on the application object metadata 114, the conversational interaction engine 126 determines that the conversational input 704 does not include a value for the name field, and provides a corresponding prompt 706 for an input name value. In response to receiving a subsequent conversational input 708 responsive to the prompt 706 for a name field value, the conversational interaction engine 126 sets the name field to the input value embodied by the conversational input 708. When it is determined that all the required attributes for creating a new application have been provided, the application platform 124 and/or the conversational interaction engine 126 creates the corresponding application object instance in the application object table 110 with the name field equal to the input value embodied by the conversational input 708. As described above, in some embodiments, the GUI display 700 may automatically be updated or replaced with a landing page GUI display corresponding to the new application. However, in the illustrated embodiment, the conversational interaction engine 126 provides an indication 710 that the requested creation of the new application has been completed in the database 104 and provides indicia 712 of additional recommended or suggested actions based on creation of a new application, thereby allowing the user to expediently begin configuring, modifying, or otherwise interacting with the new application with limited additional input.

Figure 8:
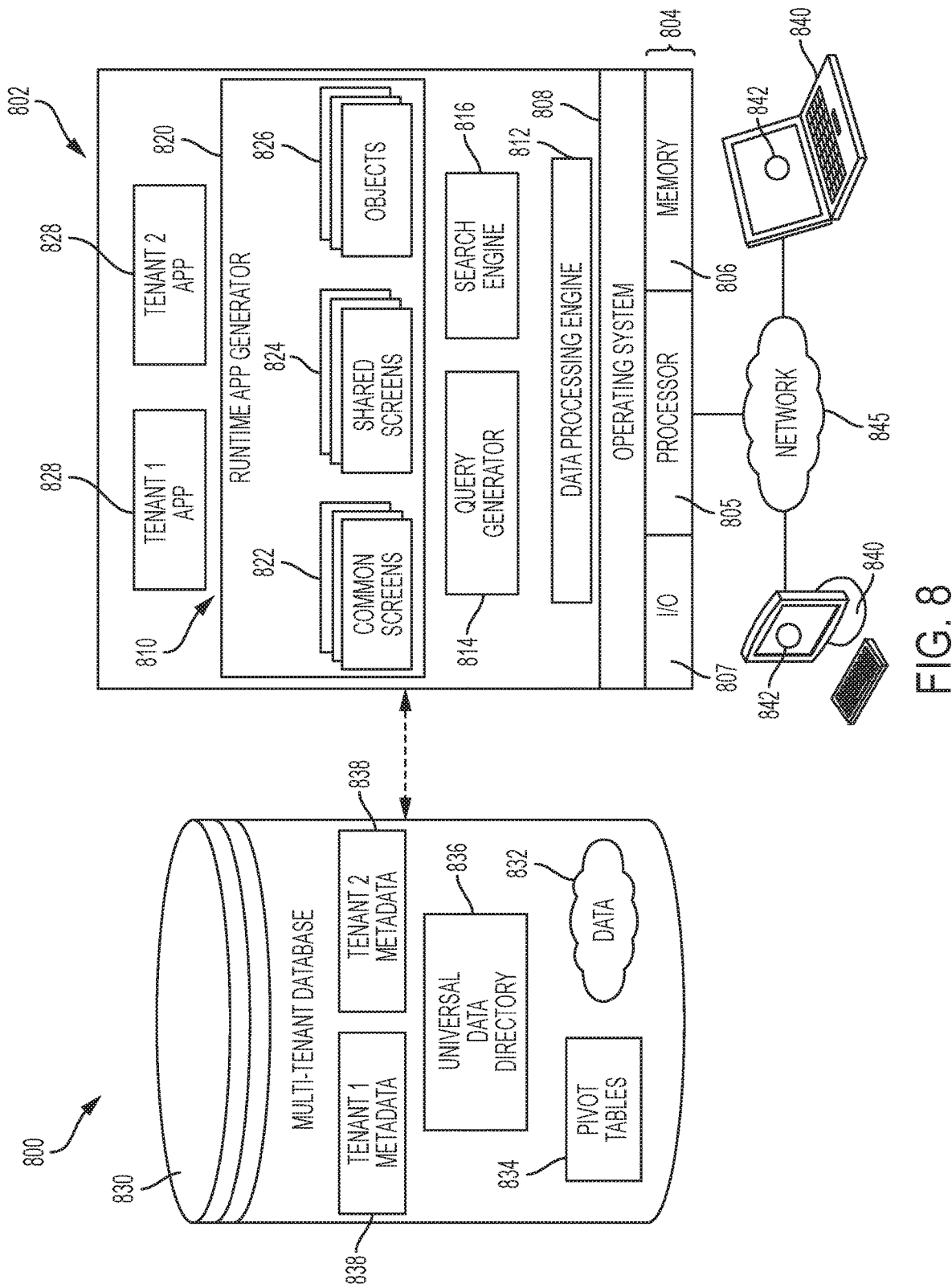
FIG. 8 is a block diagram of an exemplary multi-tenant system suitable for use with the computing system of FIG. 1 in accordance with one or more embodiments.

FIG. 8 depicts an exemplary embodiment of an on-demand multi-tenant database system 800 suitable for use with the conversational interaction process 200 of FIG. 2 or the computing system 100 of FIG. 1. The illustrated multi-tenant system 800 of FIG. 8 includes a server 802, such as server 102, that dynamically creates and supports virtual applications 828 based upon data 832 from a common database 830 (e.g., database 104) that is shared between multiple tenants, alternatively referred to herein as a multi-tenant database. Data and services generated by the virtual applications 828 are provided via a network 845 (e.g., network 108) to any number of client devices 840 (e.g., client device 106), as desired. Each virtual application 828 is suitably generated at run-time (or on-demand) using a common application platform 810 (e.g., application platform 124) that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

Still referring to FIG. 8, the server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 (e.g., client application 107) executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

Referring again to FIGS. 1-2 with reference to FIG. 8, in one or more exemplary embodiments, the server 802 and/or the application platform 810 supports the conversational interaction process 200 to allow users to perform database actions using conversational inputs. For example, the conversational interaction process 200 may be utilized to create or otherwise define custom objects 826, custom screens 824, or other custom metadata 838 along with corresponding logical relationships for supporting a customized data-driven virtual application 828 that may be provided to users associated with a particular tenant within the system 800.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, multi-tenancy, cloud computing, on-demand applications, artificial intelligence, speech recognition or analysis, digital assistants, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computing system comprising:
    a database to maintain validation rules comprising allowable values for fields associated with an application object type;
    a data storage element to maintain vocabulary data; and
    a server coupled to the database, the data storage element, and a network to;
        provide a graphical user interface (GUI) display including a conversation region within a client application at a client device coupled to the network to obtain a conversational user input from the client device coupled to the network, wherein the conversational user input comprises a string of words provided in an unstructured manner using natural language within the conversation region;
        analyze the conversational user input using the vocabulary data to identify a desire to create a new instance of the application object type corresponding to a custom virtual application to be generated within the client application by an application platform at the server at run-time based at least in part on data maintained in the database;

identify, based on the conversational user input, one or more input values for one or more attributes of a subset of required attributes for the custom virtual application identified based on the validation rules;

identify a missing attribute of the subset of required attributes associated with the application object type based at least in part on the validation rules associated with the application object type and the one or more input values for the one or more attributes;

provide, within the conversation region of the GUI display, a conversational prompt requesting input of the missing attribute for the custom virtual application within the GUI display at the client device;

analyze a subsequent conversational user input responsive to the conversational prompt within the conversation region of the GUI display to identify an input value for the missing attribute;

create the new instance of the application object type in the database having the one or more input values for the one or more attributes of the application object type and the input value for the missing attribute of the application object type;

generate one or more objects associated with the custom virtual application in the database using at least one of the input value and the one or more input values; and automatically redirect the client application to a web page corresponding to the new instance of the application object type, wherein the web page comprises a landing page GUI display corresponding to the custom virtual application having the input value for the missing attribute and the application platform at the server generates the landing page GUI display using the one or more objects associated with the custom virtual application in the database.

2. The computing system of claim 1, the server providing a virtual application within the client application on the client device coupled to the network, wherein the server automatically redirects the client application to the web page corresponding to the new instance of the application object type.

3. The computing system of claim 1, wherein the application platform at the server provides a virtual application including the GUI display and automatically updates the GUI display provided by the virtual application within the client application to the landing page GUI display corresponding to the custom virtual application.

4. The computing system of claim 1, wherein:
the missing attribute comprises a template field;
the database includes an application object table having fields that define applications capable of being generated by the application platform at the server, the fields including the template field; and
the server creates the new instance of the application object type in the database by creating a new entry in the application object table having the input value for the template field.

5. The computing system of claim 1, wherein the database maintains an application object table including fields defining a sequencing of GUI displays to be presented by the application platform in conjunction with the custom virtual application.

6. The computing system of claim 5, wherein the server creates the new instance of the application object type in the database by creating a new entry in the application object table having the input value for a template field and the fields defining the sequencing of GUI displays to be presented by the application platform in conjunction with the custom virtual application.

7. The computing system of claim 1, wherein the database maintains a custom object for integration with the virtual application.

8. The computing system of claim 1, wherein the validation rules include at least one of a range of allowable values for a field of the application object type corresponding to the missing attribute, a set of allowable values for the field of the application object type corresponding to the missing attribute, and a required field of the application object type corresponding to the missing attribute.

9. The computing system of claim 1, wherein the missing attribute comprises a required field for creating at least one of the new instance of the application object type in the database.

10. The computing system of claim 1, wherein the missing attribute comprises a required field for creating the one or more objects in the database.

11. The computing system of claim 1, wherein:
the missing attribute comprises a template field;
the one or more objects comprise one or more GUI objects generated based on the input value for the template field; and
the landing page GUI display corresponds to the custom virtual application having the input value for the template field; and
the application platform at the server generates the landing page GUI display using the one or more GUI objects associated with the custom virtual application in the database.

12. The computing system of claim 1, wherein:
the vocabulary data comprises a conversational vocabulary; and
the server comprises a conversational interaction engine configurable to:
analyze the conversational user input using the conversational vocabulary to identify the one or more attributes provided within the conversational user input;
provide the conversational prompt requesting input of the missing attribute within the conversation region; and
analyze the subsequent conversational user input responsive to the conversational prompt using the conversational vocabulary to identify the input value for the missing attribute.

13. The computing system of claim 1, wherein the conversation region comprises a chatbot GUI display overlying the GUI display.

14. The computing system of claim 13, wherein the server is configured to initially populate the chatbot GUI display with an initial prompt that solicits the conversational user input within the chatbot GUI display.

15. The computing system of claim 1, wherein the conversational prompt comprises a list of potential response values for the missing attribute.

16. The computing system of claim 15, wherein the list of potential response values comprises a menu of selectable GUI elements corresponding to the potential response values.

17. A method comprising:

receiving, at a server, a conversational user input from a conversation region of a graphical user interface (GUI) display within a client application at a client device coupled to a network, wherein the conversational user input comprises a string of words provided in an unstructured manner using natural language within the conversation region;

analyzing, at the server, the conversational user input to identify a desire to create a new instance of an application object type corresponding to a custom virtual application to be generated within the client application at run-time based at least in part on data maintained in a database by an application platform at the server, wherein the database coupled to the server maintains validation rules comprising allowable values for fields associated with the application object type;

identifying a subset of required attributes for the custom virtual application associated with the application object type based at least in part on the validation rules;

identifying, based on the conversational user input, one or more input values for one or more attributes of the subset of required attributes;

determining, at the server, a missing attribute of the subset of required attributes based at least in part on the conversational user input and the validation rules associated with the application object type;

providing, by the server, a conversational prompt requesting input of the missing attribute for the custom virtual application within the conversation region of the GUI display at the client device;

receiving, at the server, a subsequent conversational user input from the client device responsive to the conversational prompt within the conversation region of the GUI display, the subsequent conversational user input comprising an input value for the missing attribute; and creating, by the server, the new instance of the application object type in the database coupled to the server using the subsequent conversational user input, wherein the new instance of the application object type has the one or more input values for the one or more attributes of the application object type and the input value for the missing attribute of the application object type;

generating, by the server, one or more objects associated with the custom virtual application in the database using the subset of required attributes; and automatically redirecting, by the server, the client application at the client device to a web page associated with the new instance of the application object type, wherein the web page comprises a landing page GUI display corresponding to the custom virtual application having the input value for the missing attribute and the application platform at the server generates the landing page GUI display using the one or more objects associated with the custom virtual application in the database.

18. The method of claim 17, wherein:

identifying the one or more input values comprises analyzing the conversational user input using a conversational vocabulary to identify the one or more input values provided within the conversational user input; and providing the conversational prompt requesting input of the missing attribute within the conversation region; and receiving the subsequent conversational user input comprises analyzing the subsequent conversational user input responsive to the conversational prompt using the conversational vocabulary to identify the input value for the missing attribute.

19. A non-transitory machine-readable storage medium that provides instructions that, when executed by a processor, are configurable to cause said processor to perform operations comprising:

obtaining validation rules comprising allowable values for fields associated with an application object type from a database;

analyzing a conversational input comprising a string of words provided in an unstructured manner using natural language within a conversation region of a graphical user interface (GUI) display at a client device using a conversational vocabulary to:

identify a desire to create a new instance of the application object type corresponding to a custom virtual application to be generated within a client application by an application platform at run-time based at least in part on data maintained in the database; and identify, based on the conversational input, one or more input values for one or more attributes of a subset of required attributes identified based on the validation rules;

identifying a missing attribute of the subset of required attributes associated with the application object type based at least in part on the validation rules associated with the application object type and the one or more input values for the one or more attributes;

providing a conversational prompt within the conversation region of the GUI display, wherein the conversational prompt requests input of the missing attribute;

analyzing a subsequent conversational input responsive to the conversational prompt within the conversation region of the GUI display using the conversational vocabulary to identify an input value for the missing attribute;

creating the new instance of the application object type in the database having the one or more input values for the one or more attributes of the application object type and the input value for the missing attribute of the application object type;

generating one or more objects associated with the custom virtual application in the database using at least one of the input value and the one or more input values; and automatically redirecting the client application to a web page corresponding to the new instance of the application object type, wherein the web page comprises a landing page GUI display corresponding to the custom virtual application having the input value for the missing attribute and the application platform generates the landing page GUI display using the one or more objects associated with the custom virtual application in the database.

* * * * *